(12) United States Patent
Sherman et al.

(10) Patent No.: US 12,086,741 B2
(45) Date of Patent: *Sep. 10, 2024

(54) INCENTIVIZED CROWD FUNDING SYSTEM FOR INTERNAL INNOVATION BY AN ORGANIZATION

(71) Applicant: Solventum Intellectual Properties Company, Maplewood, MN (US)

(72) Inventors: Audrey A. Sherman, Woodbury, MN (US); Robert R. Kieschke, Woodbury, MN (US); Frank J. Sherman, Woodbury, MN (US); Mario A. Perez, Burnsville, MN (US); Raymond P. Johnston, Lake Elmo, MN (US); Kandyce M. Bohannon, White Bear Lake, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/120,651

(22) Filed: Dec. 14, 2020

(65) Prior Publication Data

US 2021/0097460 A1    Apr. 1, 2021

Related U.S. Application Data

(62) Division of application No. 15/151,676, filed on May 11, 2016, now Pat. No. 10,896,391.

(51) Int. Cl.
*G06Q 40/00* (2023.01)
*G06Q 10/0631* (2023.01)
(Continued)

(52) U.S. Cl.
CPC ... *G06Q 10/06311* (2013.01); *G06Q 30/0239* (2013.01); *G06Q 30/0279* (2013.01)

(58) Field of Classification Search
CPC ......... G06Q 10/06311; G06Q 30/0239; G06Q 30/0279
See application file for complete search history.

(56) References Cited

U.S. PATENT DOCUMENTS

| 7,809,641 B2 | 10/2010 | Sanders |
| 8,170,922 B2 | 5/2012 | Cavagnaro |
| (Continued) | | |

FOREIGN PATENT DOCUMENTS

| CN | 1753013 | 3/2006 |
| CN | 201876941 | 6/2011 |
| (Continued) | | |

OTHER PUBLICATIONS

Sakamoto et al: "A Community-based Crowdsourcing Service for Achieving a Sustainable Society through Micro-Level Crowdfunding", Department of Computer Science and Engineering, Waseda University, Crowdsourcing for Politics and Policy Oxford, UK, Sep. 25-26, 2014 (Year: 2014).*

(Continued)

*Primary Examiner* — Edward J Baird

(57) ABSTRACT

Crowd funding for innovation includes distributing a proposal with a description of a project idea, an amount of funds requested, and a time frame for raising the funds. Ownership of the project is transferred to an entity, which receives contributions from contributors and for each of the received contributions converts the contribution to a corresponding amount of virtual coin and adds the contribution to the funds. If the funding goal is complete within the time frame, the entity converts the coins to actual money and releases the money to the requestor. After completion of the project, the entity determines if the project is successful and can commercialize successful projects. For certain successful projects, the entity can also distribute funds to the contributors.

17 Claims, 6 Drawing Sheets

(51) Int. Cl.
    *G06Q 30/0207*    (2023.01)
    *G06Q 30/0279*    (2023.01)

(56) References Cited

U.S. PATENT DOCUMENTS

| | | |
|---|---|---|
| 8,321,321 B2 | 11/2012 | Jagarlapudi |
| 8,548,821 B2 | 10/2013 | Sheperd |
| 8,706,761 B1 | 4/2014 | Jung |
| 8,706,809 B2 | 4/2014 | D'Amore |
| 8,725,653 B1 | 5/2014 | Hernandez |
| 8,756,151 B1 | 6/2014 | Lubling |
| 9,026,922 B2 | 5/2015 | Dhaliwal |
| 10,198,733 B2 | 2/2019 | Blass |
| 2006/0124729 A1 | 6/2006 | Martin |
| 2009/0281941 A1 | 11/2009 | Worth |
| 2010/0005028 A1* | 1/2010 | Hartley .................. H04L 63/061 705/50 |
| 2010/0114685 A1 | 5/2010 | Blass |
| 2012/0059759 A1* | 3/2012 | Bagarella ............... G06Q 30/02 705/329 |
| 2012/0130853 A1 | 5/2012 | Petri |
| 2012/0130921 A1 | 5/2012 | Williams |
| 2012/0254013 A1 | 10/2012 | Chee |
| 2012/0310755 A1 | 12/2012 | Sheperd |
| 2012/0310823 A1 | 12/2012 | McNab |
| 2013/0144707 A1 | 6/2013 | Isaacson |
| 2013/0185228 A1 | 7/2013 | Dresner |
| 2013/0226688 A1 | 8/2013 | Harvilicz |
| 2013/0318005 A1 | 11/2013 | Bass |
| 2014/0025473 A1 | 1/2014 | Cohen |
| 2014/0040157 A1 | 2/2014 | Cohen |
| 2014/0046818 A1 | 2/2014 | Chung |
| 2014/0058804 A1 | 2/2014 | Zhou |
| 2014/0058968 A1 | 2/2014 | Booth |
| 2014/0164049 A1 | 6/2014 | Yakos |
| 2014/0164291 A1 | 6/2014 | Cameron |
| 2014/0194209 A1* | 7/2014 | Ziouvelou ............... A63F 13/12 463/42 |
| 2014/0229397 A1 | 8/2014 | Fink |
| 2014/0236750 A1 | 8/2014 | Zhou |
| 2014/0279645 A1 | 9/2014 | Cohen |
| 2014/0351116 A1 | 11/2014 | Hoff |
| 2015/0017611 A1 | 1/2015 | Moumneh |
| 2015/0032652 A1* | 1/2015 | Brandes ............. G06Q 30/0279 705/319 |
| 2015/0039534 A1 | 2/2015 | Erissson |
| 2015/0046239 A1 | 2/2015 | Di Franco |
| 2015/0170112 A1 | 6/2015 | DeCastro |
| 2015/0170286 A1 | 6/2015 | Gingell |
| 2015/0306503 A1* | 10/2015 | Yerli ....................... G06F 3/048 705/39 |
| 2015/0379591 A1* | 12/2015 | Massarik ............... G06Q 40/10 705/7.39 |
| 2016/0055455 A1 | 2/2016 | Hill |
| 2016/0180282 A1* | 6/2016 | Basalamah .... G06Q 10/063118 705/7.17 |
| 2016/0196553 A1* | 7/2016 | Barhydt ............. G06Q 20/3829 705/44 |
| 2016/0225100 A1 | 8/2016 | Parrila |
| 2016/0307157 A1* | 10/2016 | DeTitta ............. G06Q 30/0279 |
| 2017/0024832 A1* | 1/2017 | Dareshani ........... G06Q 20/065 |
| 2017/0178240 A1* | 6/2017 | Abuelsaad ............. G06Q 40/06 |
| 2017/0213282 A1* | 7/2017 | Dziuk .................. G06Q 40/025 |

FOREIGN PATENT DOCUMENTS

| | | | |
|---|---|---|---|
| CN | 103577935 | 2/2014 | |
| JP | 2002342569 | 11/2002 | |
| KR | 10-2007-0096313 | 10/2007 | |
| WO | WO 2014-049091 | 4/2014 | |
| WO | WO 2014-190421 | 12/2014 | |
| WO | WO-2015179957 A1 * | 12/2015 | ....... G06Q 10/06311 |
| WO | WO 2016-186980 | 11/2016 | |

OTHER PUBLICATIONS

Anand: "Is Crowdfunding Bad for Investors," Canadian Business Law Journal, 55(2), 215-230 (Year: 2014).

Lee et al: "Government-incentivized crowdfunding for one-belt, one-road enterprises: design and research issues", Financial Innovation, Department of Information Systems, City University of Hong Kong, Kowloon, Hong Kong SAR, Jan. 26, 2016 (Year: 2016).

PCT International Search Report for International Application No. PCT/US2016/032256, mailed Jul. 27, 2016.

* cited by examiner

INCENTIVIZED CROWD FUNDING SYSTEM FOR INTERNAL INNOVATION BY AN ORGANIZATION

BACKGROUND

Crowd funding is a way to fund a project by raising many small amounts of money from a large group of people. An example is the Kickstarter innovation web site from Kickstarter, Inc. (based in Greenpoint, Brooklyn, US). The Kickstarter site can be used to fund creative projects via crowd funding with Kickstarter retaining a portion of the funds as its fee. The creator of the project retains complete ownership of it. The backers are often helping to fund their friends' project and can see the creative process as it happens. Also, the backers may receive a copy of the finished creative work such as a book or CD. Since the project creator retains ownership of the project, this type of funding may not be desirable for a corporate funding of projects or ideas where the corporation wants to retain ownership of the project in order to commercialize it if the project is successful.

SUMMARY

A computer-implemented method of crowd funding for innovation, consistent with the present invention, includes distributing a proposal with a description of a project idea, an amount of funds requested, and a time frame for raising the funds. Ownership of the project is transferred to an entity. In response to the proposal, the entity receives contributions from contributors and for each of the received contributions the entity converts the contribution to a corresponding amount of coin, and adds the contribution to the funds. The entity releases an amount of money corresponding with the amount of coin in the funds if the funding goal is met within the time frame and within a bank amount of funds available for the project. The entity determines if the project is successful after the money is released. If the project is successful, the entity can optionally distribute the funds or a bonus to the contributors, converted from the coin.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of this invention include the combination of a crowd sourced idea generation electronic web site with crowd sourced funding for corporate innovation. The actual funding comes from internal corporate sources based upon contributions from individuals, since the ideas and projects that will be created and funded and ultimately produced will be the sole property of the company that employs the crowd. But the decision as to what to fund will be entirely up to the individuals (internal crowd) that are placing the funds on the projects and ideas as they see fit. The ideas are crowd sourced as well. This combination provides a new way for corporate innovation and commercialization of ideas, for example. An example of a crowd funding system for innovation is disclosed in U.S. Patent Application Publication 2016/0335610, which is incorporated herein by reference as if fully set forth.

Figure 1:
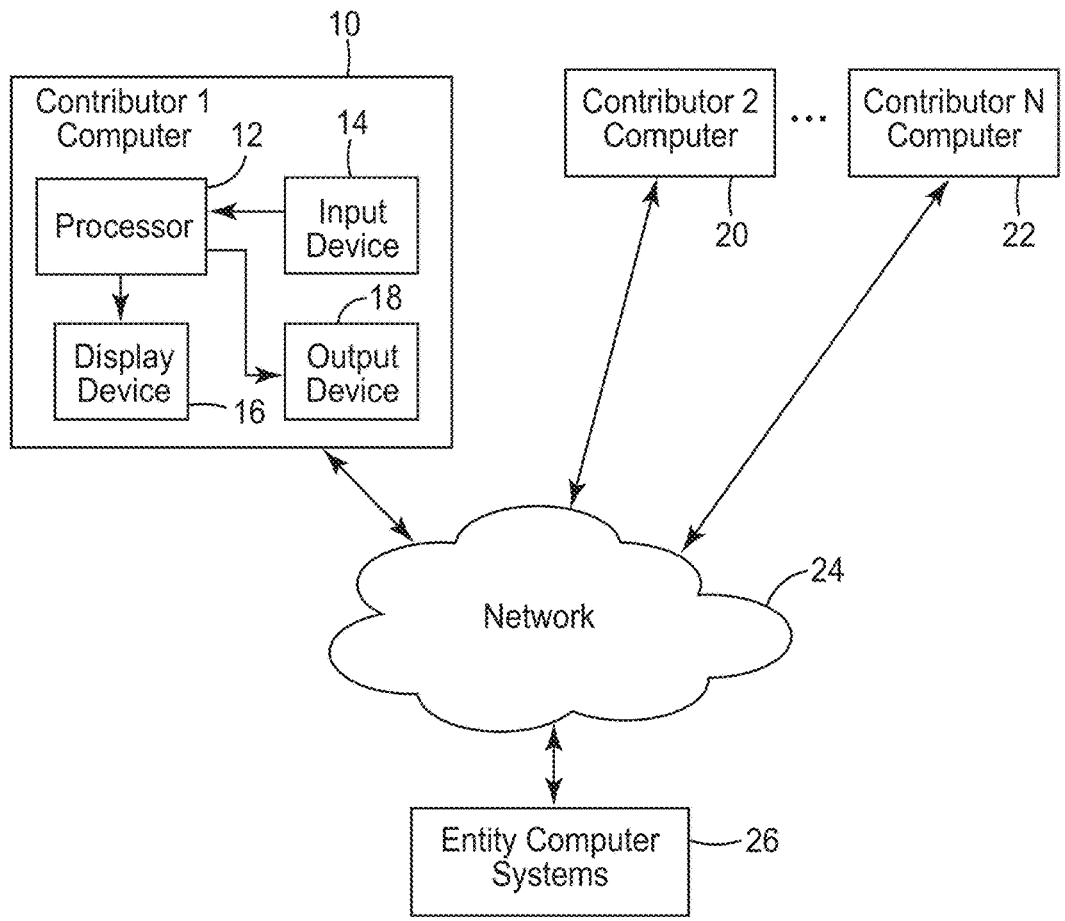
FIG. 1 is a diagram of a system for incentivized crowd funding.

FIG. 1 is a diagram of a system for incentivized crowd funding. The system includes contributor computers 10, 20, and 22 for use in contributing to a project. Contributor computer 10 can include a processor 12, an input device 14 for receiving information or commands, an electronic display device 16 for displaying information, and an output device 18 for outputting information in other forms such as audible information. Contributor computers 20 and 22 can include the same components, or be configured in the same way, as contributor computer 10. The contributor computers are electronically coupled to a network 24 such as the Internet or a corporate intranet. Entity computer systems 26 are also electronically coupled with network 24. Entity computer systems 26 can include computer applications used within large or small organizations, and such systems can include electronic mail (email), accounting systems, record keeping systems, electronic databases, and computers for hosting internal web sites. Only three contributor computers are shown for illustrative purposes, and the system can be scaled to include a large number of contributor computers, sufficient to fund a project, coupled to entity computer systems 26 via network 24. The entity can be, for example, a corporation, partnership, or other organization involved in developing ideas for innovation. The entity controls, directly or indirectly, entity computer systems 26.

Figure 2:
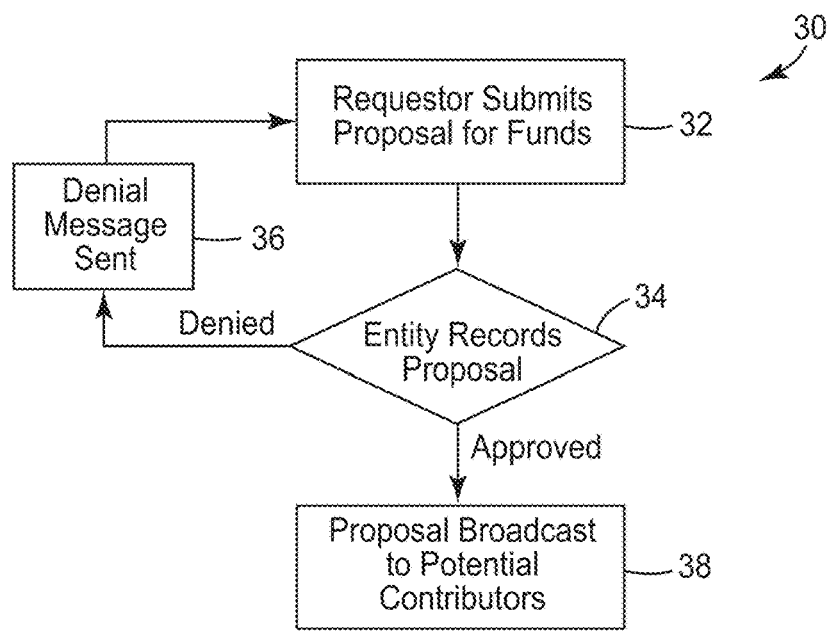
FIG. 2 is a flow chart of a method for receiving a proposal for crowd funding.

FIG. 2 is a flow chart of a method 30 for receiving a proposal for crowd funding. Method 30 can be implemented in software for execution by a computer, such as one of the contributor computers or other computer coupled to entity computer systems 26 via network 24. In method 30, a requestor electronically submits a proposal for funds (step 32). A requestor can be, for example, a person such as an employee or consultant of the entity. The requestor can also be, for example, a group of persons such as a team of employees of the entity.

Figure 4:
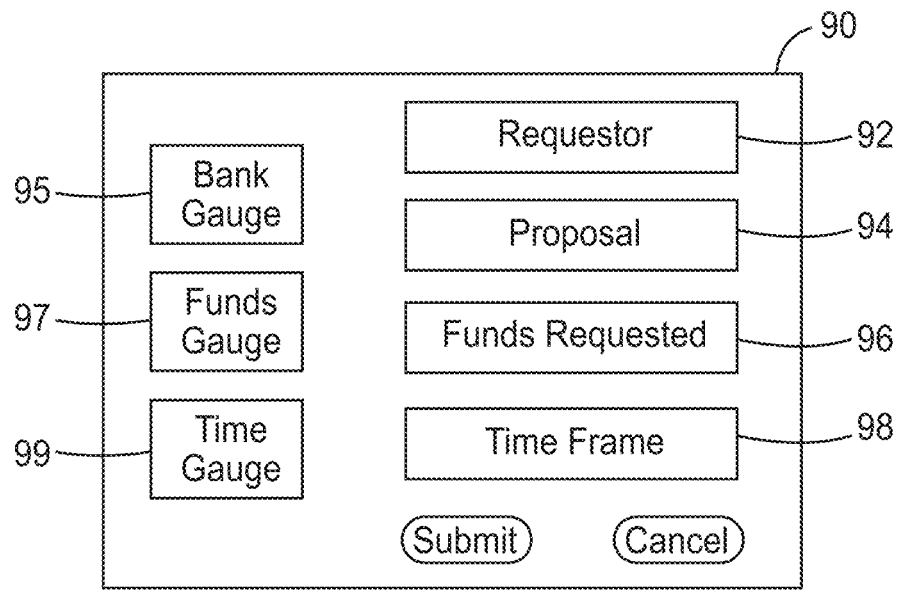
FIG. 4 is a diagram of a user interface for a requestor to submit a proposal.

FIG. 4 is a diagram of a user interface 90 for a requestor to submit a proposal. User interface 90 can be displayed on an electronic display device of a computer for the requestor to submit information. User interface 90 includes a section 92 to identify the requestor, a section 94 to describe the proposal or idea, a section 96 to identify the amount of funds requested, and a section 98 to indicate a time frame to generate the requested funds. The proposal in user interface 90 can be described in text, photos, video, or other multimedia content. User interface 90 can also include a bank gauge 95, a funds gauge 97, and a time gauge 99 to provide a visual representation of the following: the amount of coins remaining in the bank and available for this proposal in gauge 95; the funds currently obtained or collected in gauge 97; and the time remaining to reach the funding goal in gauge 99. Gauges 95, 97, and 99 can be implemented with icons in user interface 90. For example, bank gauge 95 can include a bar that decreases in length as coins from the bank are used to fund this proposal, funds gauge 97 can include a bar that increases in length as funds are collected, and time gauge 99 can include a clock that counts down showing the amount of time remaining. Gauges 95, 97, and 99 can provide a way for both the requestor and potential contributors to view the status of the crowd funding for the proposal.

Figure 8:
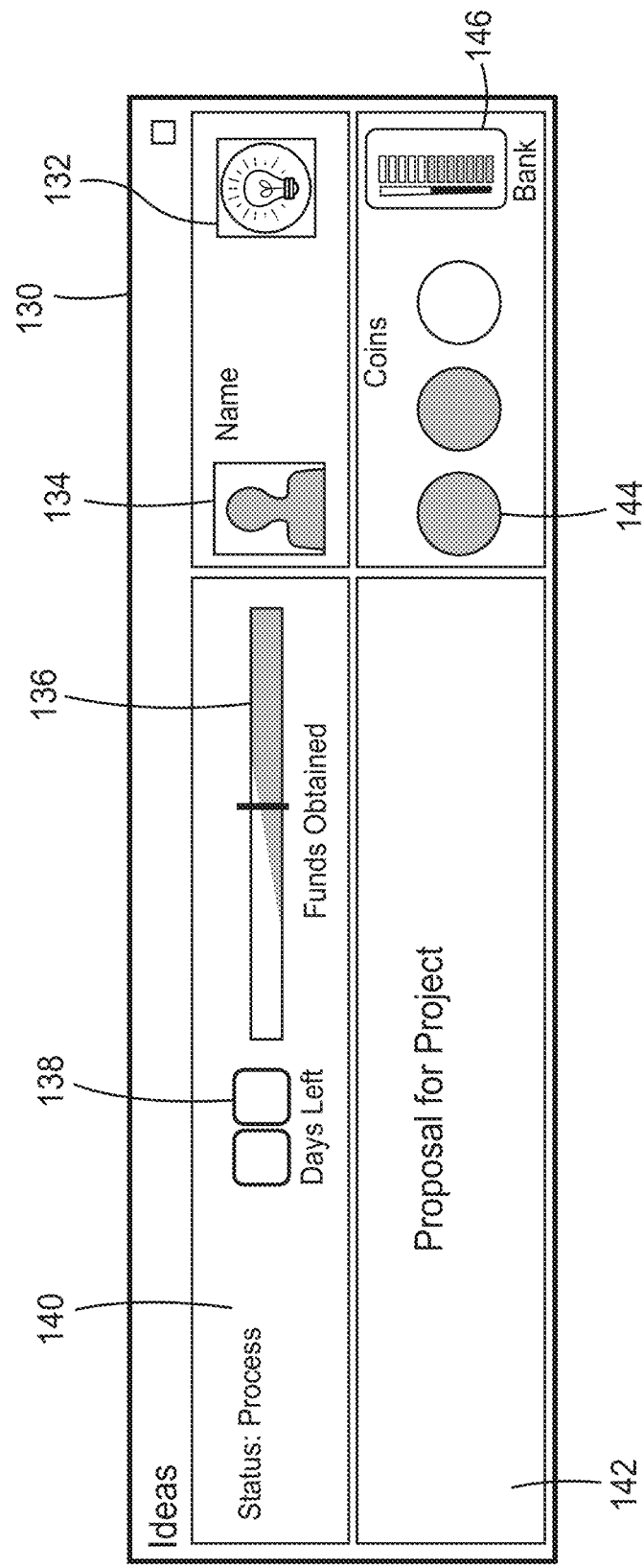
FIG. 8 is a diagram of a user interface for submitting a proposal and monitoring the status of it.

FIG. 8 is a diagram of another, and a stylized, user interface 130 for submitting a proposal and monitoring the status of it. User interface 130 can be displayed on an electronic display device of a computer for the requestor to submit a proposal for a project and monitor status information relating to the proposal. User interface 130 can be implemented, for example, as a customizable template for various groups within the entity.

User interface 130 includes a section 132 to indicate how many proposals this requestor has submitted. For example, different types of icons displayed in section 132 can indicate how many proposals this requestor has submitted and, as another example, the light bulb icon shown in FIG. 8 can indicate that this proposal is the first idea submitted by this requestor. Instead of displaying different types of icons, the light bulb icon can optionally be shown in different colors to provide an indication of how many proposals this requestor has submitted or include a displayed numeral with the icon to indicate the number of submitted proposals. Section 132, or other parts of user interface 130, can also include icons, in addition to or instead of the light bulb icon, to indicate other information relating to the requestor. For example, particular types of badge icons can be displayed and used to indicate how many proposals the requestor has contributed to, how many of the proposals the requestor has contributed to have been deemed successful, or how many of the requestor's proposals have been deemed successful. For example, a badge icon of a displayed gold circle can indicate this requestor has contributed to at least three proposals resulting in successful projects, and a badge icon of a displayed silver circle can indicate this requestor has contributed to at least one proposal resulting in a successful project. As another example, a badge icon of a displayed gold star can indicate this requestor has submitted at least three proposals resulting in successful projects, and a badge icon of a displayed silver star can indicate this requestor has submitted at least one proposal resulting in a successful project. Displaying these badge icons can thus provide, for example, information useful to contributors in deciding whether to contribute to this particular proposal and, if so, how much to contribute. The term "badge" is only used as a label to identify the type of information conveyed by the corresponding icon. A section 134 can display information about the requestor, for example a photo of the requestor and the requestor's name, assigned division within the entity, and geographic location.

A section 136, corresponding with funds gauge 97, can display an indication of the current funding obtained for the proposal and the total amount of funds requested. In this example, section 136 displays a bar that increases in length as funds are obtained, and the total length of the bar indicates the amount of funds requested. The amount funds currently obtained and the amount requested can also be displayed in text adjacent the bar. A section 138, corresponding with time gauge 99, can display an indication of the time remaining to raise funds for this proposal, in this example the number of days remaining. A section 140 can display an indication of the status of the proposal, in this example the status being the proposal is in the process of obtaining funds and has not yet been approved. Section 140 can be updated to display an indication of other status for the proposal, for example the proposal having been approved or completed. A section 142 can describe the proposal or idea for a project submitted by the requestor, and the proposal in section 142 can be described in text, photos, video, or other multi-media content. Section 142 can optionally include a link (electronic network address) to additional information about the proposal.

Figure 6:
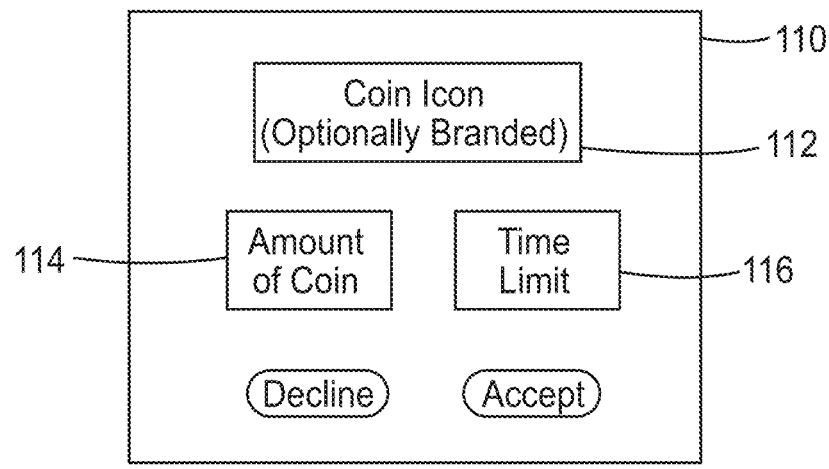
FIG. 6 is a diagram of a user interface for distributing coin to a pool of potential contributors.
Figure 7:
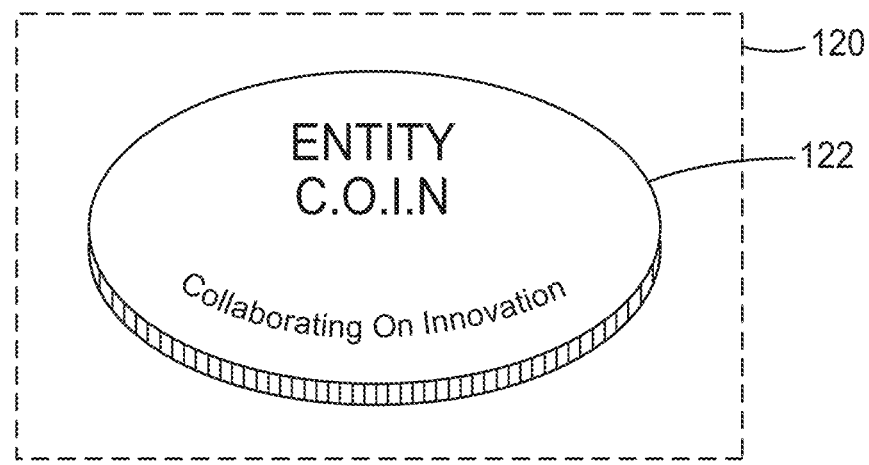
FIG. 7 is a diagram of an exemplary icon for a coin.

A section 144 can display an indication of the amount of coin available to the requestor for use in contributing to proposals. For example, each shaded icon in section 144 can correspond with a particular amount of coin available to the requestor for contributing to proposals. For example, each shaded icon can represent one hundred coins, and the value represented by each icon in section 144 can also be displayed. The icons in section 144 are shown as shaded and non-shaded circles for exemplary purposes, and these icons can be stylized as illustrated in FIGS. 6 and 7, as described below. A section 146, corresponding with bank gauge 95, can display an indication of the total amount of funds available in the bank. In this example, section 146 displays a bar that decreases in length, and a series of bars that decrease in illumination, as funds from the bank are used to contribute to this proposal.

User interface 130 can thus display a time gauge in section 138 visually indicating an amount of time remaining to obtain a requested amount of funds for the project, display a funds gauge in section 136 visually indicating an amount of funds currently obtained for the project, and display a bank gauge in section 146 visually indicating an amount of funds available for the project by contributors eligible for using the bank funds to make contributions to the project. User interface 130 can also display changes in the funds gauge and the bank gauge during the amount of time remaining, indicated by the time gauge, as contributions are received for the project, where the displayed changes in the funds gauge and the bank gauge correspond with the received contributions. The time gauge, funds gauge, and bank gauge can also be implemented with various colors to further visually indicate the status of, respectively, time remaining, current funds obtained, and funds remaining in the bank. The contributors to the proposal identified in section 142 can possibly have access to user interface 130 to monitor the status of the proposal and view the gauges for the proposal.

The entity records the proposal via entity computer systems 26 (step 34) in method 30 of FIG. 2. The entity also determines whether to approve the proposal for crowd funding. Whether to approve the proposal can be determined by, for example, a committee with members who have voting rights to approve or deny proposals. If the proposal is denied, the entity can send a denial message such as via email to the requestor via network 24 from entity computer systems 26 (step 36). The proposal can be denied if, for example, all the syntax or information for the proposal is not complete, even though the idea itself would be approved. The review of the proposal to determine whether to approve or deny it would occur to determine if the proposal is complete and not to limit the idea, although in some embodiments the review can occur to approve or deny the actual idea proposed. If the proposal is approved, the entity broadcasts the proposal to potential contributors (step 38). The proposal can be broadcast as an email to eligible contributors for the project, or the proposal can be posted on an internal web site for the entity, and a message such as an email or text message can be sent to eligible contributors notifying them of the proposal.

Figure 3A:
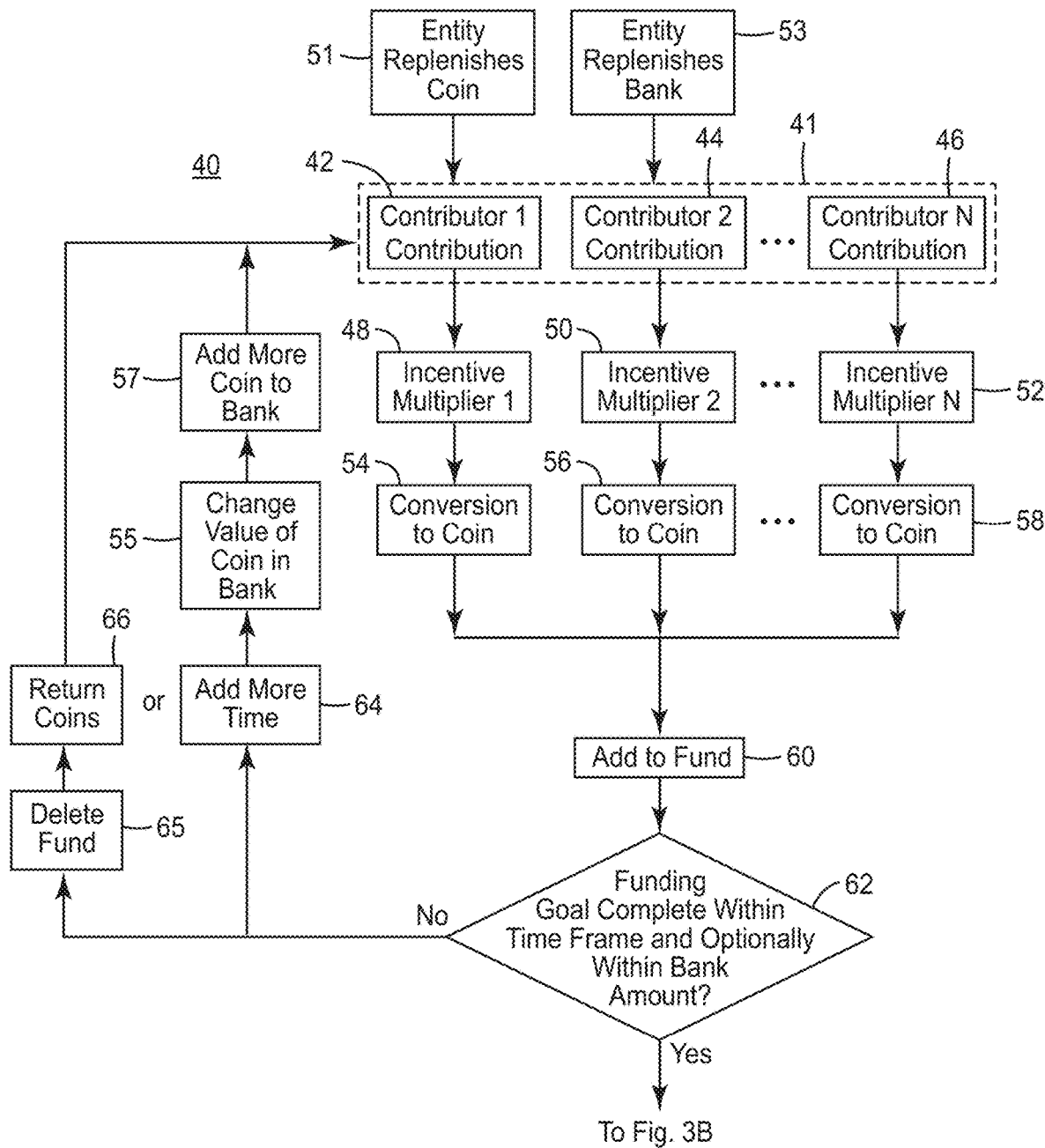
FIGS. 3A and 3B are a flow chart of a method for incentivized crowd funding.
Figure 3B:
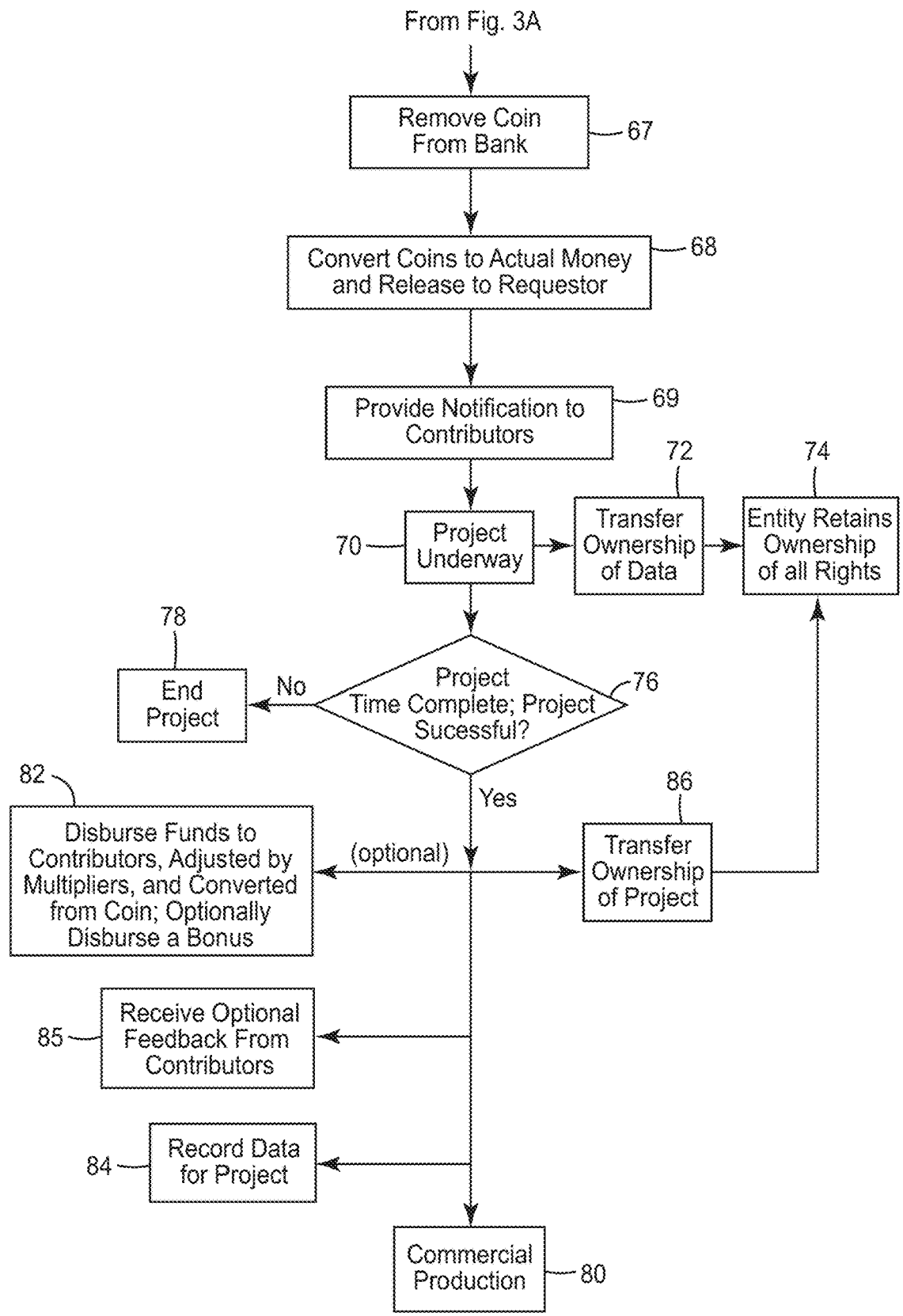

FIGS. 3A and 3B are a flow chart of a method 40 for incentivized crowd funding. Method 40 can be implemented in software for execution by the contributor computers 10, 20, and 22, and entity computer systems 26. In method 40, the pool of potential contributors 41, as represented by contributions 42, 44, and 46, can view a proposal and make a contribution to fund it. Only three contributions are shown for illustrative purposes; the funding could come from a wide range of the number of contributors. A contributor can be, for example, a person such as an employee or consultant of the entity. The contributors can also be, for example, a group of persons such as a team of employees of the entity.

Figure 5:
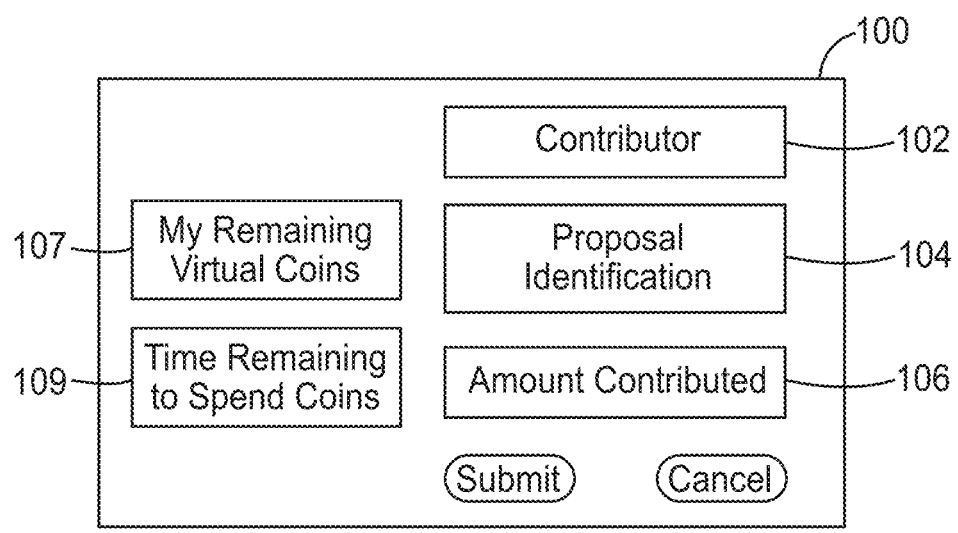
FIG. 5 is a diagram of a user interface for making a contribution to a proposal.

FIG. 5 is a diagram of a user interface 100 for making a contribution to a proposal. User interface 100 can be displayed on an electronic display device of a computer for the contributor to make a contribution. User interface 100 includes a section 102 to identify the contributor, a section 104 to identify the proposal to which the contributor is making a contribution, and a section 106 to indicate the amount contributed to this proposal. The amount contributed can be billed to the contributor or assessed as a payroll deduction, for example. If the contributor is providing coin for the funding, then the amount of the contribution can be deducted from the contributor's coin account. User interface 100 can also include a section 107 to display an indication of the contributors remaining amount of coin, and a section 109 to display an indication of the time remaining for the contributor to spend the coin on proposals. The virtual coins represented in section 107 can also include coins from the bank available to fund this proposal and available to this contributor for funding it.

Each of the contributors' contributions 42, 44, and 46 can be selectively subject to corresponding incentive multipliers (steps 48, 50, and 52, respectively). Incentives are provided in part by multipliers that can increase the potential return based upon particular criteria such as the country where a contributor is based, the group or division to which a contributor is assigned, the number of successful projects to which the contributor has contributed, or other criteria to encourage participation by certain individuals or groups. As an example, the incentive multiplier can be 1.5 or 2.0 so that, if a project is successful, the corresponding contributor receives 1.5 times or twice the original contribution, respectively. Instead of using corporate or entity funds to make one large internal grant, the corporate funds can be used to encourage participation by offering a potential return based upon the incentive multipliers. When a proposal is broadcast, the entity can optionally include an identification of incentive multipliers for the project. For example, if the entity wants to encourage participation by employees of the entity based in Europe, the entity can indicate that any contributor based in Europe will receive an incentive multiplier along with an indication of such multiplier. As another example, if the entity wants to encourage participation by employees who work in the same group or division as the requestor, the entity can indicate that any of those employees as contributors will receive an incentive multiplier.

Also, to provide for raising many small amounts of money, the individual contributions, represented by contributions 42, 44, and 46, can be limited to a certain percentage of the fund goal (amount requested), for example 5% or 1%. For example, if the requested amount of funds is $10,000, the entity can limit individual contributions to 5% of that amount or $500. As another example, the entity can establish a monetary limit such as $100 for each contribution to a proposal. Other percentages or monetary limits are possible, if used. These limits can help to encourage participation by a large number of contributors as often desired for crowd funding. If an individual contribution exceeds the limit, when used, then the contribution is not accepted, and the corresponding contributor can possibly be notified that the attempted contribution exceeded the limit.

The contributions 42, 44, and 46, after selectively adjusted by the incentive multipliers, are converted to a corresponding amount of coin (steps 54, 56, and 58, respectively), and the resulting amounts are added to the fund in step 60. Coin can be used as artificial or virtual currency. In particular, coin is an artificial monetary amount representing an actual amount of money preferably in a single currency. Coin can also be branded to convey specific corporate messages or link the history of the organization (entity) to significant people or events in the life of the organization. Coin thus provides a way to convert contributions in a variety of currencies to a universal monetary unit, as well as communicate to requestors and contributors.

The existing currency exchange rates can be used to convert from a contributor's currency to coin, or artificial exchange rates can be generated for conversion to coin. The exchange rate used to convert to coin is saved to later potentially convert back to currency when funds are disbursed for successful projects. The type of currency for coin can be, for example, the currency of a requestor's country. For example, if the requestor is based in the United States, then the coin can represent US dollars for this requestor's fund, and the contributor's contributions, if not in US dollars, are converted from the currency of origin to US dollars. For example, if a contributor is based in Europe and the requestor is based in the United States, the contributor's contribution can be converted using the current exchange rate (at the time of the contribution) from euros to US dollars. The artificial exchange rates, if used, can be another way to provide incentives by establishing exchange rates between particular currencies greater than existing exchange rates.

Furthermore, instead of contributing actual money, it is possible for contributors to earn coin through particular activities such as presenting a technical paper, the contributors' number of granted patents, or the contributor's rating as determined by performance reviews. The earned coins can optionally have an expiration date, for example at the end of the current fiscal year for the entity.

Instead of, or in addition to, earning coin the entity can distribute coin to the pool of potential contributors 41 in step 51. In particular, the entity can replenish coins to the pool of contributors. The entity can also replenish coin in the bank in step 53. The bank can represent a total amount of coin available for funding proposals, possibly with limits concerning contributors who may use the coin in the bank, proposals for which the contributors may use the coin in the bank, and an amount of coin in the bank each eligible contributor may use to fund projects. For example, the total amount of coin in the bank can be reserved for use by only employees within a particular division of the company with each of those eligible employees allotted only a certain amount of coin in the bank and, as another example, for use only within a particular time frame. As other examples of such limits, the coin in the bank can be limited for use only by employees within a particular geographic region or only by employees who have previously contributed to a particular number of successful projects. The bank can thus include several banks of coin based upon these limits, for example. The entity can replenish coin in the bank for step 53 on a regular basis, for example the entity can replenish the bank every calendar quarter or every fiscal quarter for the entity.

The entity can also replenish the coin in the bank at other times or according to other criteria.

This distributed coin, and possibly the earned coin and the coin in the bank, can be owned by the entity and licensed to the contributors with the license specifying how the coin can be used and a time limit on it. For example, the license can include the following terms: the coin can only be used to fund eligible requestors' proposals; the coin represents a value of actual money but has no monetary value itself; and the coin must be used within the current fiscal year of the entity, otherwise the coin expires.

FIG. 6 is a diagram of a user interface 110 for distributing or sending coin to a pool of potential contributors. User interface 110 can be displayed on an electronic display device of a computer for potential contributors to receive the coin. User interface 110 includes a section 112 to display a coin icon representing coin, a section 114 to display the amount of coin (number of units) to be distributed or sent to a potential contributor, and a section 116 to display a time limit for using the distributed coin. If the coin is licensed to the potential contributor, the contributor can select the accept button on user interface 110 to accept the terms of the license and receive the coin into the contributors coin account subject to the license. The contributor could view the license terms in user interface 110 or another associated user interface. The value of the coins distributed can be based upon, for example, a particular proposal. As an example, if the requestor for a proposal is based in the United States, then one coin (one unit) can equal one US dollar. As another example, if the requestor for a proposal is based in Europe, then one coin (one unit) can equal one European Union euro.

As indicated above, the coin can optionally be branded. FIG. 7 is a diagram of an exemplary icon 122 for coin to be displayed on an electronic display device or screen represented by dashed line 120, for example as the coin icon 112 in user interface 110 or the coin icons in section 144 of user interface 130. This exemplary icon 122 resembles a monetary coin and can include the entity name or brand, possibly stylized, along with a message as shown.

Entity computer systems 26 determine if the funding goal is complete within the specified time frame for contributions and optionally within a total amount in the bank available for this proposal (step 62) in method 40 of FIGS. 3A and 3B. If the funding goal is not complete, entity computer systems 26 can add more time for raising funds (step 64), or delete the fund (step 65) and return any coins to the contributors (step 66). Deleting the fund in step 65 means that the contributors are not charged with the amounts of actual money they had proposed contributing, and if the contributors originally used earned coin as the proposed contribution, those coins are returned to the contributors coin account in step 66. If more time is added to raise funds, the requestor can optionally refine the proposal and resubmit it.

In addition, if more time is added in step 64, the entity can also change the value of the coin in the bank for this proposal (step 55) or add more coin to the bank for this proposal (step 57), or perform both steps 55 and 57. Changing the value of the coin in the bank for this proposal can effectively increase the amount of funds available for it. For example, the entity can initially set the value of the coin in the bank as one coin represents one US dollar and then change the value of the coin in the bank as one coin represents ten US dollars. In some cases, the entity may change the value of the coin in the bank for this proposal by decreasing the value, for example if more coin is added to bank for funding this project.

If the funding goal is complete within the time frame (step 62), entity computer systems 26 convert the coins for the proposal to actual money and release the money to the requestor (step 68), and the project is underway (step 70). If coin from the bank was used to fund this proposal, entity computer systems 26 remove a corresponding amount of coin from the bank (step 67). Also, entity computer system 26 can provide a notification to contributors that the proposal to which they contributed has met its funding goal and the corresponding project is underway (step 69). This notification can include, for example, an email message, a posting on an internal web site, and a change in the status in section 140 of user interface 130.

By using coin to represent an artificial monetary amount, actual money for the funds can optionally be locally released to the requestor in the country where the requestor is based. For example, if the entity is based in the United States but the requestor is based in Europe, the entity can instruct a European division of the entity to release the actual money to the requestor rather than transferring money from the United States to a European location or account. The actual money can be released by, for example, providing an electronic transfer of funds to the requestor's bank account or by issuing a check to the requestor. Furthermore, by using coin to represent an artificial monetary amount, the actual money for the project is only expensed when the project is approved, for example.

Upon beginning the project, the requestor transfers ownership of the data for the project to the entity (steps 72 and 74). Transferring ownership of the data can include transferring intellectual property rights in the data such as any applicable patent, copyright, trademark, and trade secret rights. As the project is underway, a status of the project can be provided to the contributors by, for example, an email message or electronic posting, allowing the contributors to track the progress of the projects to which they have contributed.

When the project time is complete, it is determined whether the project was successful (step 76). If the project was not successful, the project ends and no funds are returned to the contributors, having taken the risk of funding the project (step 78). If the project was successful, the project can possibly enter commercial production by the entity (step 80). A project can be deemed successful if, for example, the project can result in a commercial product for the entity, if the project results in a working prototype, or according to other criteria. Also, the requestor transfers ownership of the project to the entity (steps 86 and 74). Transferring ownership of the project can include transferring ownership of any resulting prototypes or other physical items and transferring intellectual property rights in the project such as any applicable patent, copyright, trademark, and trade secret rights.

Entity computer systems 26 record data for the project (step 84) and optionally disburse funds to the contributors, adjusted by the corresponding incentive multipliers, and converted from coin to the contributors' currencies using the corresponding conversion rates (step 82). When step 82 is executed, the funds or bonus can be disbursed by, for example, electronic transfers to the contributors' bank accounts or by issuing checks to the contributors. If the project was funded with coins distributed to the pool of potential contributors, then the entity may not execute step 82. If the project was funded in part by contributors money converted to coin, then the entity may elect to execute step 82 for those types of contributions. Alternatively for step 82, the contributors, or selected ones of the contributors, can receive a type of bonus, for example a monetary bonus or an increase in virtual coins to reinvest in other projects with the coins being deposited into the contributors' coin accounts. Another type of bonus can involve rewarding successful investors, meaning the contributors who have contributed to projects deemed successful. A contributor's number of successful projects can be tracked, and the contributors who contribute to such successful projects can be rewarded with additional or increasing amounts of virtual coin to reinvest in other projects. This bonus for contributing to successful projects can be, for example, a set amount of coin for each successful project or increasing amounts of coin based upon the number of successful projects. Therefore, those contributors who have a proven record of contributing to successful projects can be rewarded with more coin and encouraged to invest in more proposals they believe will result in successful projects.

Furthermore, if the project was successful, entity computer systems 26 can receive optional feedback from the contributors for the proposal corresponding with this project (step 85). Feedback from the contributors to the project can include the following information: an up vote indicating approval of the completed project; a down vote indicating disapproval of the completed project; an indication that the project did not meet the contributors' expectations; or an indication that the project exceeded the contributors' expectations. The feedback can be provided, for example, in a user interface such as part of user interfaces 100 or 130.

Security features can be incorporated into this crowd funding system based upon various criteria such as groups or geographic regions. For example, if a proposal is only available for funding by contributors within a particular group or division of the entity, then only those contributors can be granted access to information about the proposal. As another example, if a proposal is only available for funding by contributors within a geographic region, then only those contributors within that geographic region can be granted access to information about the proposal.

Table 1 provides an example of a data structure for granting coin to contributors based upon particular activities. Table 2 provides an example of a data structure for recording conversion rates for converting contributions to a corresponding amount of coin. Table 3 provides an example of a data structure for recording data for contributions for a particular project. Table 4 provides an example of a data structure for recording coin distributed to potential contributors. Table 5 provides an example of a data structure for recording project data. Table 6 provides an example of a data structure for a bank of coin, divided into multiple banks, where each bank has a group of requestors eligible for having coin from the bank used for their proposals and groups of contributors eligible for using coin from the bank for contributing to those proposals. Tables 1-6 are representative of data structures to be stored in a computer memory or electronic database for access by the entity computer systems or other computers.

TABLE 1

Earned Coin Amounts

| Activity | Amount of Coin |
|---|---|
| activity 1 | amount 1 |
| activity 2 | amount 2 |
| . . . | |
| activity N | amount N |

TABLE 2

Conversion Rates

| Type of Currency | Rate for Conversion to Coin |
|---|---|
| Coin | 1 |
| currency 1 | current rate for currency 1 OR artificial rate 1 |
| currency 2 | current rate for currency 2 OR artificial rate 2 |
| . . . | |
| currency N | current rate for currency N OR artificial rate N |

TABLE 3

Project Contributors

| Contributor | Country | Contribution | Incentive Multiplier | Conversion Rate |
|---|---|---|---|---|
| contributor ID 1 | country 1 | amount 1 | multiplier 1 | rate 1 |
| contributor ID 2 | country 2 | amount 2 | multiplier 2 | rate 2 |
| . . . | | | | |
| contributor ID N | country N | amount N | multiplier N | rate N |

TABLE 4

Coin Distribution

| Pool of Potential Contributors | Amount (Number of Coins) | Expiration Date |
|---|---|---|
| contributor ID 1 | amount 1 | date 1 |
| contributor ID 2 | amount 2 | date 2 |
| . . . | | |
| contributor ID N | amount N | date N |

TABLE 5

Project Data

| Project ID | Requestor | Amount of Coin Received | Product |
|---|---|---|---|
| project 1 | requestor 1 | fund 1 | product 1 |
| project 2 | requestor 2 | fund 2 | product 2 |
| . . . | | | |
| project N | requestor N | fund N | product N |

TABLE 6

Bank of Coin

| Bank | Amount of Coin | Value of Coin | Eligible Requestors | Eligible Contributors |
|---|---|---|---|---|
| bank 1 | amount 1 | value 1 | requestors 1a, 1b, . . . 1n | contributors 1a, 1b, . . . 1n |
| bank 2 | amount 2 | value 2 | requestors 2a, 2b, . . . 2n | contributors 2a, 2b, . . . 2n |
| . . . | | | | |
| bank N | amount N | value N | requestors Na, Nb, . . . Nn | contributors Na, Nb, . . . Nn |

The crowd funding method described above can be implemented, for example, as a software application integrated with existing entity computer systems. The entity controls the process in part by owning the proposal, the project, and coins for it. The entity also owns the intellectual property rights covering the proposal and the project, providing an incentive for the entity to commercialize successful projects. This crowd funding method thus provides a specific type of crowd funding that may be useful for organizations as a way to fund innovation and internally develop ideas, aside from the more commonplace ways organizations fund research and development.

The invention claimed is:

1. A computer-implemented method of presenting gauges for use in crowd funding for innovation, comprising steps of:
    presenting a user interface on an electronic display device, the user interface displaying an identification of a proposal for a project;
    displaying within the user interface a time gauge visually indicating an amount of time remaining to obtain a requested amount of funds for the project;
    displaying within the user interface a funds gauge visually indicating a total amount of funds contributed by one or more contributors at a particular time for funding the project;
    displaying within the user interface a bank gauge visually indicating an amount of funds available from a bank to the one or more contributors that are eligible to make contributions to fund the project, wherein the bank gauge also displays the amount of funds available as provided by an entity that is entitled to received transfer of ownership of the project;
    receiving from the bank one or more contributions by contributors eligible to make contributions to fund the project;
    displaying changes in the funds gauge and the bank gauge responsive to the receiving of the one or more contributions during the amount of time remaining to obtain the requested amount of funds, where the displayed changes in the funds gauge and the bank gauge correspond with the received contributions;
    converting the contributions to coin according to first conversion rates based on types of currencies and second conversion rates based on a country where each of the contributors is based, wherein the coin is an artificial monetary amount representing an actual amount of money;
    displaying the funds gauge visually indicating the converted contributions;
    when the amount of time remaining to obtain a requested amount of funds for the project has concluded:
    determining whether the project has been successfully funded based on criteria specific to the project;
    when it is determined that the project has been successfully funded and funded in part by contributions converted to coin:
    converting received contributions from coin to each of the contributor's respective currencies using at least one of the first and second conversion rates; and
    disbursing funds to each of the contributors in the contributor's respective currencies using an electronic transfer of funds.

2. The method of claim 1, further comprising displaying within the user interface an identification of a requestor for the proposal.

3. The method of claim 2, further comprising displaying within the user interface a badge icon indicating how many proposals resulting in successful projects the requestor has contributed to.

4. The method of claim 2, further comprising displaying within the user interface a badge icon indicating how many of the requestor's proposals resulted in successful projects.

5. The method of claim 2, further comprising displaying within the user interface an icon providing an indication of how many proposals the requestor has submitted.

6. The method of claim 1, wherein the time gauge displays a number of days as the amount of time remaining.

7. The method of claim 1, wherein the funds gauge displays a bar that increases in length as the funds are received.

8. The method of claim 7, wherein a total length of the bar indicates the amount of funds requested.

9. The method of claim 7, wherein the user interface displays the amount funds obtained at the particular time and the requested amount of funds in text adjacent the bar.

10. The method of claim 1, wherein the user interface displays a status of the proposal.

11. The method of claim 1, wherein the user interface describes the proposal in text, photos, or video.

12. The method of claim 1, wherein the user interface displays an indication of an amount of the coin available to a requestor for the proposal for use in contributing to proposals.

13. The method of claim 12, wherein the user interface displays icons corresponding with the amount of coin available to the requestor.

14. The method of 12, wherein at least some of the coin represents the requestor's time used to earn the at least some of the coin.

15. The method of claim 1, wherein the bank gauge displays at least one of a bar that decreases in length and a series of bars that decrease in illumination as the funds from the bank are used to contribute to the proposal.

16. The method of claim 1, wherein the criteria specific to the project includes at least one of whether the project is capable of entering commercial production or whether the project results in a working prototype.

17. The method of claim 15, wherein displaying changes in the funds gauge and the bank gauge responsive to the receiving further comprises:
    increasing the length of the funds gauge in the user interface to indicate a contribution;
    when the bank gauge displays a bar that decreases in length, decreasing the length of the bank gauge in the user interface to indicate that less funds are available to fund the project; and
    when the bank gauge displays a series of bars that decrease in illumination, decreasing the illumination of the series of bars to indicate that less funds are available to fund the project.

* * * * *